United States Patent
Roithinger

(10) Patent No.: US 6,782,849 B2
(45) Date of Patent: Aug. 31, 2004

(54) COOLING SYSTEM FOR AN INTERNAL COMBUSTION ENGINE

(75) Inventor: Robert Roithinger, St. Valentin (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/300,766

(22) Filed: Nov. 21, 2002

(65) Prior Publication Data

US 2003/0150408 A1 Aug. 14, 2003

(30) Foreign Application Priority Data

Feb. 14, 2002 (AT) .......................................... 93/2002 U

(51) Int. Cl.[7] .................................................. F01P 1/00
(52) U.S. Cl. .................................................... 123/41.56
(58) Field of Search ............................ 123/559.1, 562, 123/563, 564, 565, 41.01, 41.05, 41.56, 41.29, 41.31, 41.51, 41.49, 41.55

(56) References Cited

U.S. PATENT DOCUMENTS

| 4,062,188 | A | * | 12/1977 | Cutler et al. .................. 60/599 |
| 4,213,426 | A | | 7/1980 | Longhouse |
| 4,774,911 | A | | 10/1988 | Yamaguchi et al. |
| 5,020,327 | A | | 6/1991 | Tashima et al. |
| 5,142,866 | A | | 9/1992 | Yanagihara et al. |
| 5,408,979 | A | | 4/1995 | Backlund et al. |
| 5,492,167 | A | | 2/1996 | Glesmann |
| 5,597,047 | A | | 1/1997 | Thompson et al. |
| 6,029,345 | A | | 2/2000 | Christensen |
| 6,129,056 | A | * | 10/2000 | Skeel et al. .............. 123/41.49 |
| 6,585,035 | B2 | * | 7/2003 | Zobel et al. ................... 165/43 |

FOREIGN PATENT DOCUMENTS

| DE | 3933518 | 4/1990 |
| DE | 19928193 | 1/2000 |
| DE | 19948220 | 1/2001 |
| JP | 62085123 | 4/1987 |
| JP | 2000120439 | 4/2000 |

* cited by examiner

Primary Examiner—Tony M. Argenbright
Assistant Examiner—Hyder Ali
(74) Attorney, Agent, or Firm—Dykema Gossett PLLC

(57) ABSTRACT

A cooling system for an internal combustion engine with two-stage supercharging includes a charge-air line in which is provided a first compressor of a first turbocharger and a second compressor of a second turbocharger downstream of the former, a first charge-air cooler being provided between first and second compressor, and a second charge-air cooler downstream of the second compressor. At least one of the two charge-air coolers is disposed upstream of the coolant cooler as seen in a flow direction of the cooling air, and the second charge-air cooler is disposed above or beside the first charge-air cooler.

16 Claims, 3 Drawing Sheets

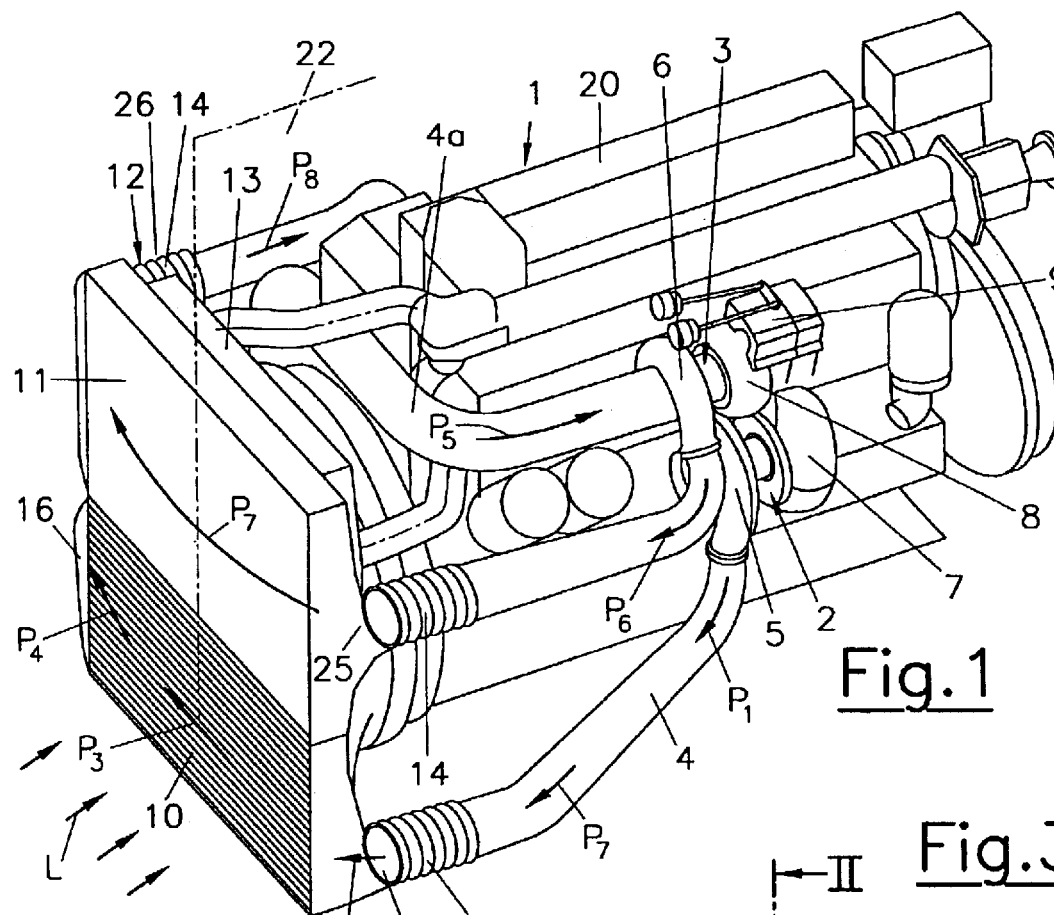
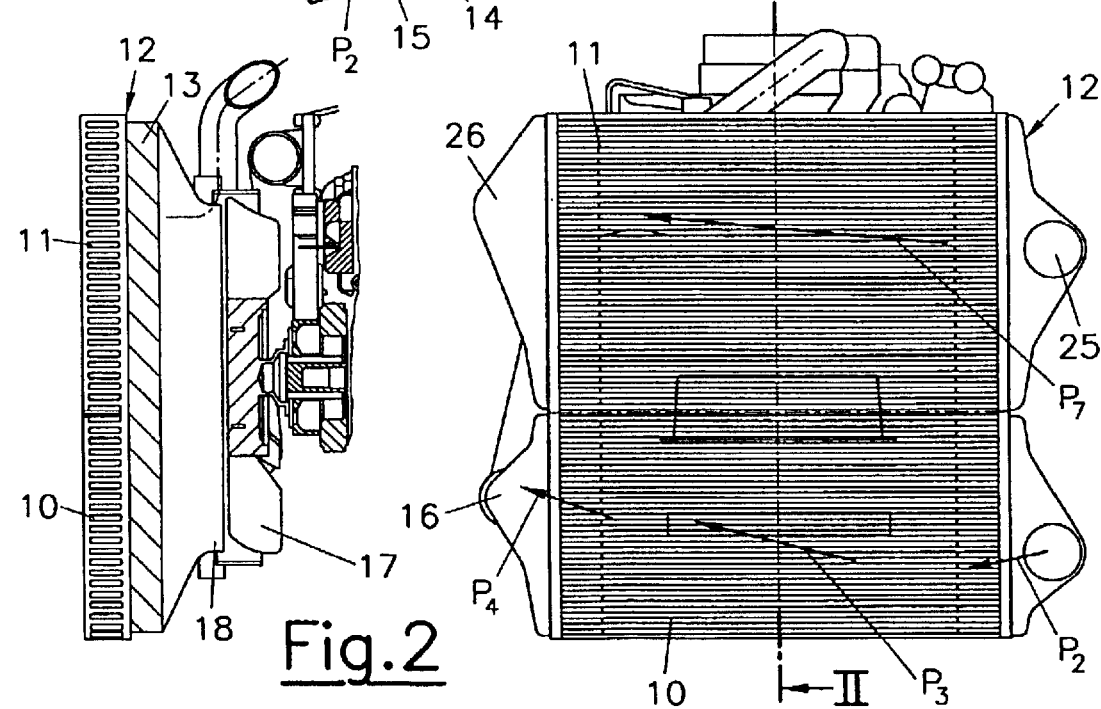

COOLING SYSTEM FOR AN INTERNAL COMBUSTION ENGINE

BACKGROUND OF THE INVENTION

The invention relates to a cooling system for an internal combustion engine with two-stage supercharging, including a charge-air line in which are provided a first compressor of a first turbocharger and a second compressor of a second turbocharger downstream of the former, a first charge-air cooler being provided between first and second compressor, and a second charge-air cooler downstream of the second compressor.

DESCRIPTION OF PRIOR ART

A cooling system of an internal combustion engine with two-stage supercharging of the above kind is disclosed in JP 62-085123 A. The first charge-air cooler or intercooler between first and second compressor will lower the charge-air temperature and thus prevent the second compressor from overheating. The cooling system does not provide for any charge control in dependence of the operating state of the engine, however. For this reason the turbochargers will not always reach optimum efficiency. A similar type of cooling system is described in DE 199 48 220 A1.

DE 39 33 518 A1 presents an internal combustion engine with a sequential turbocharger system comprising a first-stage high-volume turbocharger and a second-stage low-volume turbo-charger. By means of an intake bypass valve the second-stage low-volume turbocharger may be bypassed. This known kind of cooling system includes a charge-air cooler downstream of the first compressor, but no intercooler between first and second compressor. Due to the high exit temperature of the air leaving the first compressor, the second compressor, and most of all the compressor impeller, will be subject to high thermal loads, especially if a conventional impeller of cast aluminum is employed. Conventional impellers of cast aluminum are prone to low-cycle fatigue due to overheating. When the speed of the compressor impeller is increased tensile stresses in the hub region will result. When the speed is reduced the shift in stress will lead to compression stresses in the hub region. With a defined number of cycles and critical impeller dimensioning such fluctuating loads will destroy the impeller. Use of an intercooler can prevent this. Similar cooling systems are described in U.S. Pat. Nos. 5,020,327 A, 5,142,866 A, and 5,408,979 A.

U.S. Pat. No. 5,492,167 A discloses a cooling system with a liquid cooler and a charge-air cooler, which latter may be placed in front of the liquid cooler.

JP 2000-120439 A shows an engine cooling design with an intercooler being provided in front of a liquid cooler.

In U.S. Pat. No. 6,029,345 A a cooling system for an automotive vehicle is disclosed, which comprises a condensor, a charge-air cooler and a radiator. Condenser and charge-air cooler are disposed in front of the radiator in flow direction of the cooling air.

In conventional cooling systems charge-air cooler or coolant cooler are directly attached to the vehicle frame. This demands the use of flexible elements in the charge-air and/or cooling lines in order to compensate relative movements between engine and frame. Besides, flexible elements and/or correspondingly large spaces must be provided between fan cowling and engine. Such cooling systems are disclosed in U.S. Pat. Nos. 4,213,426 A and 4,774,911 A.

An engine cooling system with a coolant radiator is known from U.S. Pat. No. 5,597,047 A, which is held by a radiator support frame attached directly to the engine block. Dampening modules are disposed between the radiator and the support frame attached to the engine. The advantage of such cooling assemblies which are rigidly connected to the engine is that connecting lines may be short.

SUMMARY OF THE INVENTION

It is the object of this invention to develop an efficient cooling system for an internal combustion engine featuring a space-saving, light-weight design with a reduced number of parts and long life.

According to the invention this object is achieved by disposing at least one of the two charge-air coolers upstream of the coolant cooler in flow direction of the cooling air, and by providing the second charge-air cooler above or beside the first charge-air cooler. Disposing the charge-air coolers in front of the coolant cooler will safe space and help obtain efficient cooling of the charge air.

Due to the two-stage supercharging design comparatively low-cost materials may be employed. The first charge-air cooler will allow the charge-air temperature between the two compressors to be reduced to a level which will permit the use of a conventional impeller of cast aluminum even for the second compressor without adverse effects on its impeller life due to excessively high temperatures of the intake air upon entry into the second compressor. As a consequence the problem of low-cycle fatigue of the compressor impeller will be avoided.

By disposing the second charge-air cooler above the first charge-air cooler it will be possible to save space and obtain optimum cooling of the charge air.

According to an especially preferred variant the inlet and outlet of at least one charge-air cooler, and preferably the first charge-air cooler, are provided on one and the same side relative to a vertical plane extending through the center of gravity of the charge-air cooler in the flow direction of the cooling air. Advantageously, at least one charge-air cooler, and preferably the first charge-air cooler, is provided with a separating wall through the center of gravity, which acts as a partition between incoming and outgoing charge-air stream, so that an essentially U-shaped flow path is obtained for the charge air flowing through the charge-air cooler. In this way the charge-air line between the first charge-air cooler and the second compressor may be kept very short, thus saving material and reducing flow losses.

In a preferred embodiment of the invention it is proposed that the cooling assembly comprising first and second charge-air cooler and the coolant cooler be rigidly attached to the engine. This arrangement will allow for small distances between the individual parts, as relative movements need not be taken into account. In this way a very compact cooling system will be obtained. Moreover, flexible elements in the charge-air lines will become superfluous, and costs and maintenance may be reduced. No flexible elements, such as rubber hoses of low fatigue strength will be required. Nor need the cooling assembly be attached to a supporting frame with the use of rubber bearings. For installation in the vehicle the rigidly connected cooling assembly is lifted together with the engine and the gearbox into a flexible drive unit supporting frame. Since no flexible elements are used in the charge-air lines the individual coolers and lines will not be subject to gas reaction forces. Separate support elements and the like will thus become superfluous.

Alternatively it could be provided that the cooling assembly be rigidly attached to the vehicle frame. In this instance flexible hose elements must be provided in the charge-air line between first compressor, first charge-air cooler, second compressor, second charge-air cooler, and an intake manifold.

In further development of the invention the proposal is put forward that the second turbocharger be bypassed in a controlled manner, preferably at the exhaust end. Bypassing the second compressor, i.e., the high-pressure compressor, by means of the bypass line and at least one or several valves in the instance of large exhaust volumes, such as at high loads or engine speeds, will permit both turbochargers to run at optimum operating conditions, thus significantly raising engine efficiency compared to uncontrolled serial charging systems. The compact high-pressure turbine/compressor combination will pick up speed fast even in the instance of low exhaust energies. In this way the internal combustion engine will show good response.

For generating the cooling-air stream a preferably axial-flow type fan is provided, which is driven by a switchable coupling to regulate the amount of cooling air. If only a small amount of cooling air is required the driving power may be reduced accordingly. The coupling is preferably provided with a visco-thermoelement. Alternatively, the coupling could be controlled externally via at least one cooling-air temperature sensor and an electronic control unit.

BRIEF DESCRIPTION OF THE DRAWINGS

The invention will be further described below with reference to the accompanying drawings, in which FIG. 1 is an oblique view of a first variant of the internal combustion engine proposed by the invention, FIG. 2 is a section of the engine along line II—II in FIG. 3, FIG. 3 is a front view of the engine.

Parts of the same function have identical reference numerals throughout all variants.

DETAILED DESCRIPTION OF THE PREFERRED EMBODIMENTS

Figure 4:
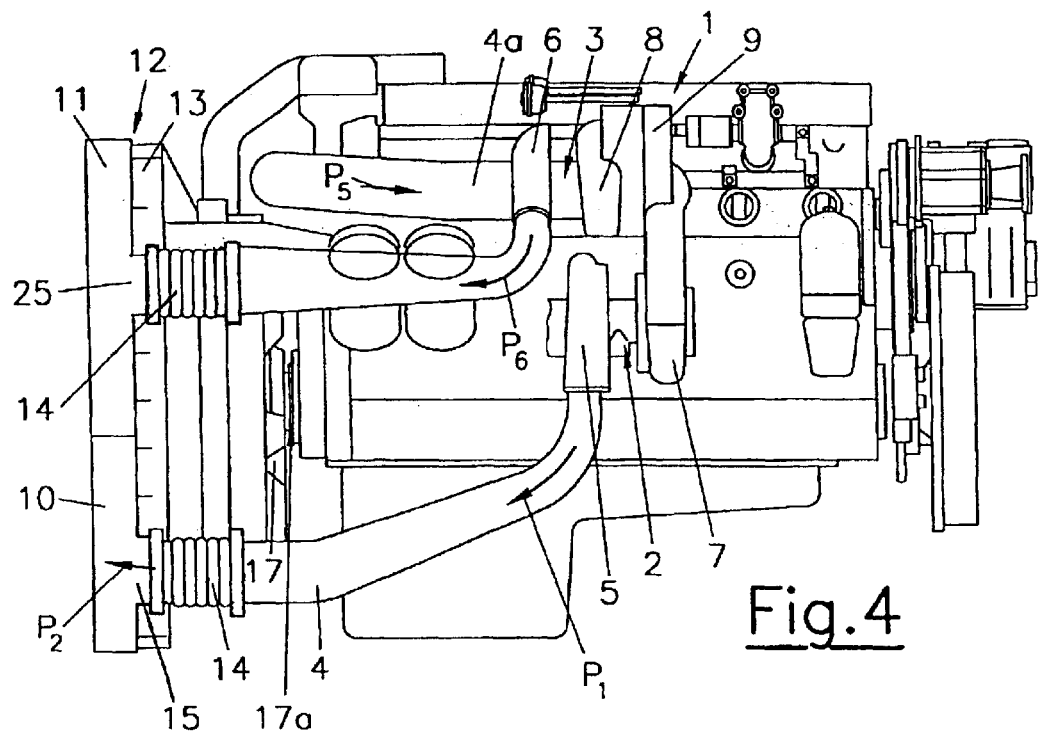
FIG. 4 is a side view of the engine.
Figure 5:
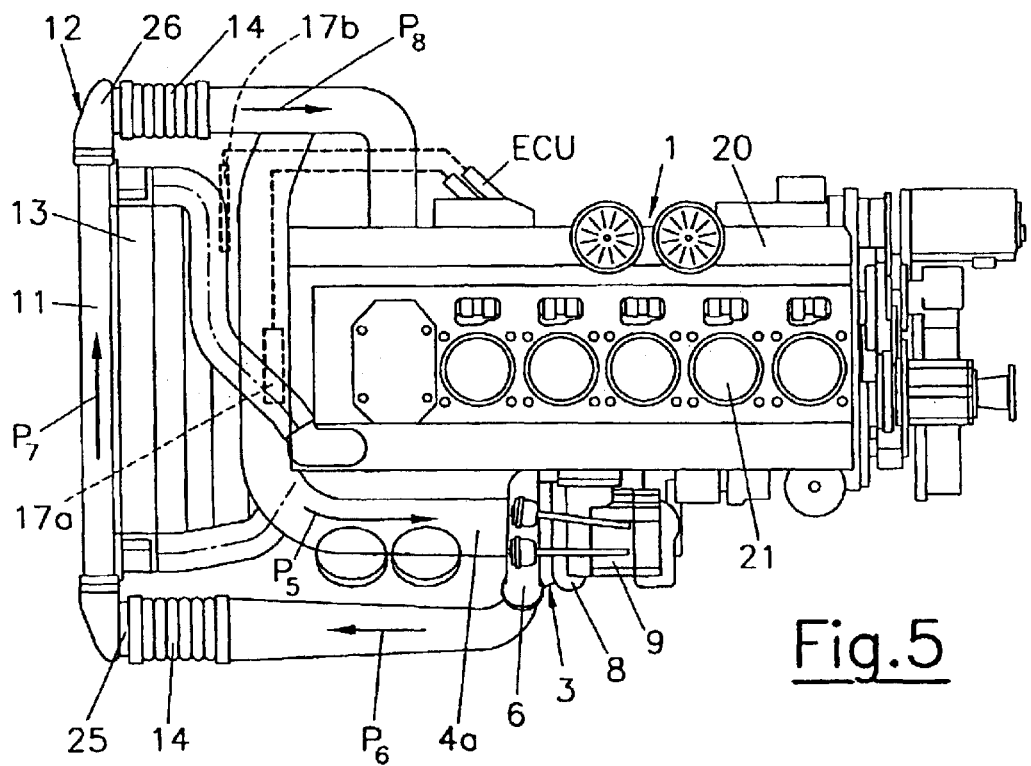
FIG. 5 is a view from above of the engine.

The internal combustion engine 1 features a two-stage supercharging system with a first turbocharger 2 and a second turbocharger 3. The charge-air line 4 contains the first compressor 5 of the first turbocharger 2, and the second compressor 6 of the second turbocharger 3 downstream thereof. The first exhaust gas turbine of the first turbocharger 2 bears the reference numeral 7, whilst the second exhaust gas turbine of the second turbocharger 3 is referred to as 8. The first-stage first turbocharger is a high-volume unit, whilst the second-stage second turbocharger 3 is a low-volume unit.

The second exhaust gas turbine 8 of the second turbocharger 3 can be bypassed by means of a bypass device 9 with at least one valve.

Between the first compressor 5 and the second compressor 6 a first charge-air cooler 10 is positioned in the charge-air line 4. A further, second charge-air cooler 11 is provided downstream of the second compressor 6. Charge-air coolers 10, 11 are part of a cooling assembly 12 which also includes the coolant cooler 13. The first and second charge-air coolers 10, 11 are positioned upstream of the coolant cooler 13 in flow direction of the air as indicated by arrows L. The second charge-air cooler 11 is positioned above the first charge-air cooler 10. In this way a very compact design is obtained.

The fan 17, which is positioned upstream of the coolant cooler 13 with respect to the cooling air L and is driven via a switchable coupling 17a, is configured as axial-flow blower. The switchable coupling 17a may include a visco-thermoelement and may be self-regulating. Alternatively, the coupling 17a may be controlled externally via a cooling air temperature sensor 17b and a control unit ECU. The fan cowling bears reference numeral 18.

In the variants discussed the cooling assembly 12 is rigidly attached to the vehicle frame, flexible elements 14 being provided between the sections of the charge-air line 4 between first compressor 5 and first charge-air cooler 10, and second compressor 6, second charge-air cooler 11 and an inlet manifold 20.

The charge air arriving from an air filter not shown in the drawing is blown into the first compressor 5 of the first exhaust gas turbine 2, where it is compressed and subsequently delivered to the first charge-air cooler 10 in the direction of arrow $P_1$. In the first charge-air cooler 10 the air passes along arrows $P_2, P_3, P_4$ from the cooler inlet 15 to the cooler outlet 16 and is cooled in the course of this passage. It will then pass along arrow $P_5$ to the second compressor 6 of the second turbocharger 3. In the second compressor 6 configured as high-pressure stage the air will be further compressed and delivered to the second charge-air cooler 11 along arrow $P_6$, where its temperature is further reduced. The air flows through the second charge-air cooler 11 from the second cooler inlet 25 to the second cooler outlet 26 in transverse direction along arrow $P_7$, leaving the second charge-air cooler 11 on the side of the vertical plane 22 opposite of the second cooler inlet 25. The charge-air $P_8$ exiting the second charge-air cooler 11 is passed on to the inlet manifold 20 and further to the individual cylinders 21.

Figure 6:
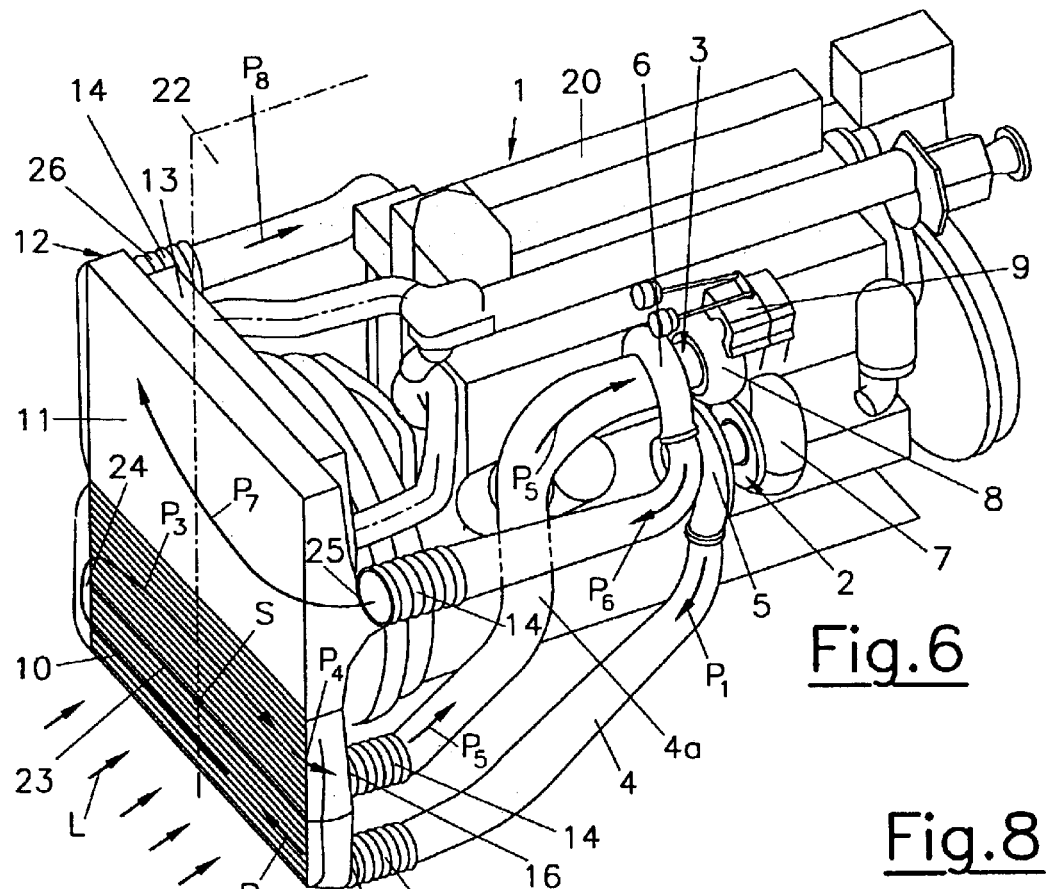
FIG. 6 is an oblique view of a second variant of the internal combustion engine proposed by the invention.
Figures 7, 8:
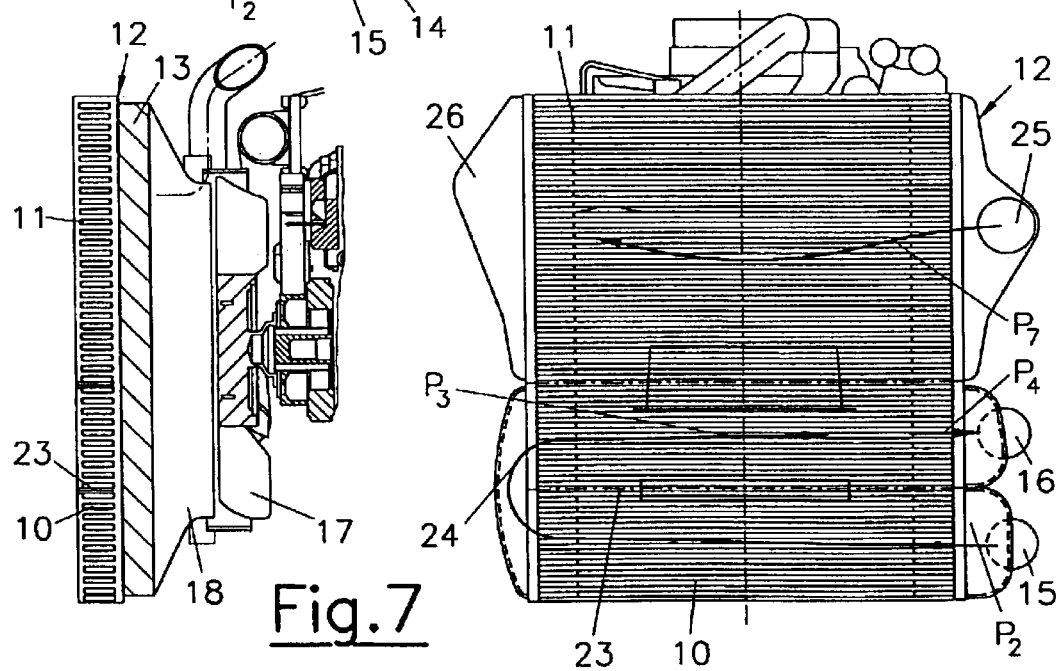
FIG. 7 is a section of the engine along line VII—VII in FIG. 8.
FIG. 8 is a front view of the engine.

In the variant shown in FIGS. 6 to 8 the cooler inlet 15 and cooler outlet 16 of the first charge-air cooler 10 are provided on the same side of a vertical plane extending through the center of gravity S of the charge-air cooler 10 in flow direction of the cooling air L. The stream of charge air entering the first charge-air cooler 10 as indicated by arrow $P_2$ and exiting it as indicated by arrow $P_4$ is divided, apart from a passage 24 on the side opposite of the cooler inlet 14 and the cooler outlet 16. In this way the charge air will pass through the first charge-air cooler 10 in transverse direction, its course assuming the shape of an U, as indicated by arrow $P_3$. The advantage of this configuration is that the charge-air line 4a between the first charge-air cooler 10 and the second compressor 6 may be kept short.

What is claimed is:

1. Cooling system for an internal combustion engine with two-stage supercharging, including a charge-air line in which is provided a first compressor of a first turbocharger and a second compressor of a second turbocharger downstream thereof, a first charge-air cooler being provided between said first and second compressors, and a second charge-air cooler downstream of the second compressor, wherein at least one of the two charge-air coolers is disposed upstream of the coolant cooler in a flow direction of the cooling air, and the second charge-air cooler is disposed immediately above or beside the first charge-air cooler.

2. Cooling system according to claim 1, wherein an inlet and an outlet of at least one charge-air cooler are provided on one and the same side relative to a vertical plane extending through a center of gravity of the charge-air cooler in the flow direction of the cooling air.

3. Cooling system according to claim 2, wherein the inlet and outlet of the first charge-air cooler are provided on one and the same side relative to the vertical plane.

4. Cooling system according to claim 1, wherein at least one charge-air cooler is provided with a separating wall through the center of gravity, which acts as a partition between incoming and outgoing charge-air streams, so that an essentially U-shaped flow path is obtained for the charge air flowing through the charge air cooler.

5. Cooling system according to claim 4, wherein the first charge-air cooler is provided with the separating wall through the center of gravity.

6. Cooling system according to claim 1, wherein a cooling assembly comprising first and second charge-air coolers and the coolant cooler is rigidly attached to the engine.

7. Cooling system according to claim 6, wherein the cooling assembly is rigidly attached to the vehicle frame.

8. Cooling system according to claim 1, wherein flexible hose elements are provided in the charge-air line between first compressor, first charge-air cooler, second compressor, second charge-air cooler, and an intake manifold.

9. Cooling system according to claim 1, wherein the second turbocharger is bypassed in a controlled manner.

10. Cooling system according to claim 9, wherein the second turbocharger is bypassed at the exhaust end.

11. Cooling system according to claim 1, including a fan for generation of a cooling air stream, wherein the fan is driven by a switchable coupling.

12. Cooling system according to claim 11, wherein the fan in an axial-flow type fan.

13. Cooling system according to claim 11, wherein the switchable coupling is provided with a visco-thermoelement.

14. Cooling system according to claim 11, wherein the coupling is controlled externally via at least one cooling-air temperature sensor and an electronic control unit.

15. Cooling system according to claim 1, wherein said second charge-air cooler is in contact with said first charge-air cooler.

16. Cooling system according to claim 15, wherein said second charge-air cooler is positioned above said first charge-air cooler.

* * * * *